United States Patent [19]

Hageman et al.

[11] Patent Number: 5,186,292
[45] Date of Patent: Feb. 16, 1993

[54] TORQUE CONVERTER AND CLUTCH WITH COMPLIANCE INTERFACE

[75] Inventors: John B. Hageman, Vandalia; Gerald C. Danielewicz, Dayton, both of Ohio

[73] Assignee: General Motors Corporation, Detroit, Mich.

[21] Appl. No.: 881,107

[22] Filed: May 11, 1992

[51] Int. Cl.⁵ ............................................. F16D 33/00
[52] U.S. Cl. ................................ 192/3.28; 192/3.29; 192/3.33; 192/107 C
[58] Field of Search ............... 192/3.28, 3.29, 3.25, 192/3.33, 107 C, 107 M

[56] References Cited

U.S. PATENT DOCUMENTS

| | | | |
|---|---|---|---|
| 2,607,456 | 8/1952 | Jandasek | 192/3.28 X |
| 4,044,556 | 8/1977 | Kuramochi et al. | 192/3.28 X |
| 4,153,147 | 5/1979 | Chana | 192/3.28 |
| 4,177,885 | 12/1979 | Ross | 192/3.3 |
| 4,413,711 | 11/1983 | Lamarche | 192/3.28 |
| 4,427,098 | 1/1984 | Kubo et al. | 192/3.28 |
| 4,441,594 | 4/1984 | Kubo et al. | 192/3.28 |
| 4,529,079 | 7/1985 | Albertson | 192/107 C |
| 4,785,924 | 11/1988 | Jackel | 192/3.28 X |
| 4,821,855 | 4/1989 | Jackel | 192/3.28 X |
| 4,821,860 | 4/1989 | Crawford | 192/107 C |
| 4,867,290 | 9/1989 | MacDonald et al. | 192/3.28 |
| 5,076,409 | 12/1991 | Graton et al. | 192/107 C |
| 5,103,942 | 4/1992 | Schmitt | 192/107 M |

FOREIGN PATENT DOCUMENTS

| | | | |
|---|---|---|---|
| 57-54767 | 4/1982 | Japan | 192/3.29 |
| 3-144153 | 6/1991 | Japan | 192/3.29 |

*Primary Examiner*—Leslie A. Braun
*Assistant Examiner*—Andrea Pitts
*Attorney, Agent, or Firm*—Donald F. Scherer

[57] ABSTRACT

A torque converter and clutch assembly incorporates a selectively engageable clutch pressure plate which enforces frictional engagement between a clutch disc, mounted on the pressure plate, and the input shell of the torque converter. An elastomer lined compliant interface is disposed intermediate the pressure plate and the clutch disc for the purpose of permitting surface configuration compliance between the input shell and the clutch disc as well as between the clutch disc and the pressure plate.

3 Claims, 2 Drawing Sheets

TORQUE CONVERTER AND CLUTCH WITH COMPLIANCE INTERFACE

BACKGROUND OF THE INVENTION

This invention relates to torque converter clutch assemblies, and more particularly, to such assemblies wherein the clutch friction interface is accomplished at surfaces between the clutch pressure plate and the torque converter input shell.

Prior art torque converter and clutch assemblies incorporate a pressure plate with a friction disc bonded thereto and disposed for axial displacement for engagement with the input shell of the torque converter. The input shell of the torque converter generally has a machined surface thereon which provides the frictional interface for the friction disc and pressure plate. Due to tolerances and manufacturing methods, the alignment of the annular surface of the friction disc and the input shell is not ideal. In other words, there are imperfections such as waviness or conical configurations which prevent the frictional surfaces from providing a continuous annular engagement.

Prior art torque converter and clutch assemblies have attempted solutions to this problem including the use of an elastomer disc bonded between the friction material and the pressure plate. This solution does afford some degree of relief for the problem, however, the bonding material and the elastomer disc must be sufficiently strong to withstand the stresses present during the transmission of torque between the input shell and the pressure plate. This torque transmission results in shear forces being imposed on the elastomer disc and between the elastomer disc and its bonded surfaces. Since these shear forces can be quite large and have a detrimental affect on the elastomer material, the useful life of the clutch is shortened and/or the cost of bonding, bonding materials and elastomer materials is greatly increased.

SUMMARY OF THE INVENTION

The present invention seeks to provide a compliant interface between the pressure plate, the friction surface and the input shell without incorporating the disadvantages of the prior art. This is accomplished by providing the friction disc on a separate rigid member which is substantially rotatably secure with the pressure plate while being axially movable relative thereto.

An elastomeric covered metal disc is disposed between the friction disc and the pressure plate and is made rotatably fast with the friction disc. This eliminates any torsional shear forces being imposed upon the elastomeric material or its bonding interface. The friction disc can be made sufficiently supple such that compliance between the input shell and the friction disc will occur, thus overcoming the minor manufacturing discrepancies and providing substantially complete abutment at the friction interface of the clutch.

It is therefore an object of this invention to provide an improved torque converter and clutch assembly, wherein compliance at the friction interface is maintained.

It is a further object of this invention to provide an improved torque converter and clutch assembly, wherein an elastomeric interface is disposed between a pressure plate and a friction disc to permit compliance between the friction disc and a torque converter input shell, and further wherein the torsional transmission forces are not imposed upon the elastomeric material.

It is another object of this invention to provide a torque converter and clutch assembly having a friction interface compliance mechanism disposed between the clutch pressure plate and the input shell which incorporates a pair of disc members, both of which are axially movable relative to the pressure plate and each other, but are rotatable secure with the pressure plate.

These and other objects and advantages of the present invention will be more apparent from the following description and drawings.

DESCRIPTION OF THE PREFERRED EMBODIMENT

Figure 1:
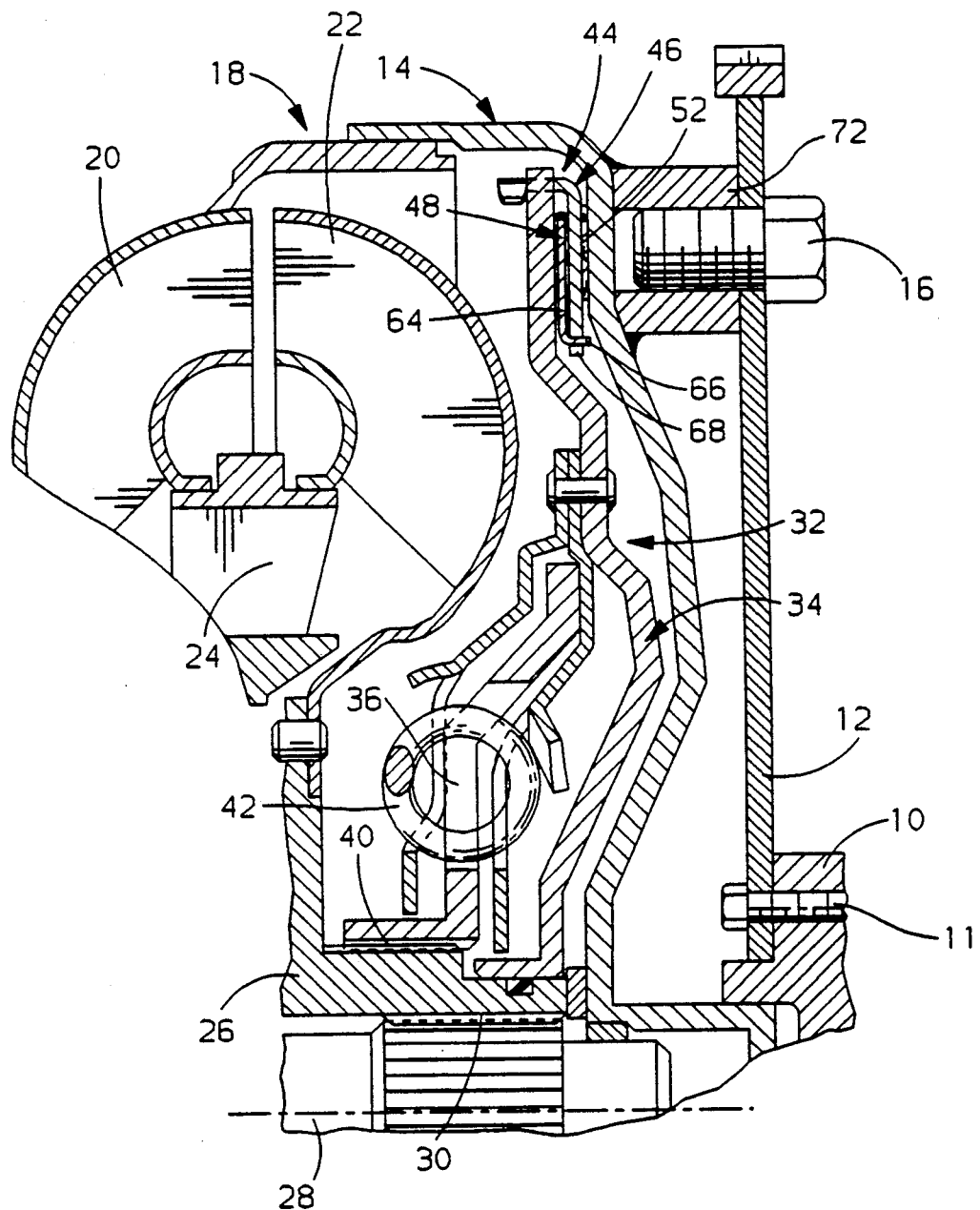
FIG. 1 is a cross-sectional elevational view of a portion of a torque converter and clutch assembly incorporating the present invention.

Referring to the drawings, wherein like characters represent the same or corresponding parts throughout the several views, there is seen, particularly in FIG. 1, an engine output shaft or crankshaft 10 which is secured by a plurality of fasteners 11 to a conventional flex plate 12, which in turn is secured to an input shell 14 by conventional fasteners 16. The input shell 14 is a component of a torque converter 18 which also includes an impeller 20 drivingly connected to the input shell 14 and including an output hub, not shown, which is adapted to drive a conventional positive displacement fluid pump.

As is well known in fluid drives, such as the torque converter 18, the fluid source is mandatory to provide for maintaining the torque converter filled with fluid. The torque converter 18 further includes a turbine 22 and a stator 24 which are disposed in toroidal flow relationship with the impeller 20. The stator 24 is connected via a one-way device, not shown, to a stationary component or housing of a transmission, also not shown.

The impeller 20, turbine 22 and stator 24 are conventional bladed members which, as is well known, provide a fluid drive between the engine crankshaft 10 and various components of a power transmission. The turbine 22 has a hub 26 which is connected to drive a transmission input shaft 28 through a spline connection 30. The turbine hub 26 also supports a clutch and damper assembly 32 which includes a pressure plate 34 slidably disposed on the hub 26 and a damper hub 36 which is connected via a spline connection 40 to the turbine hub 26.

Figure 2:
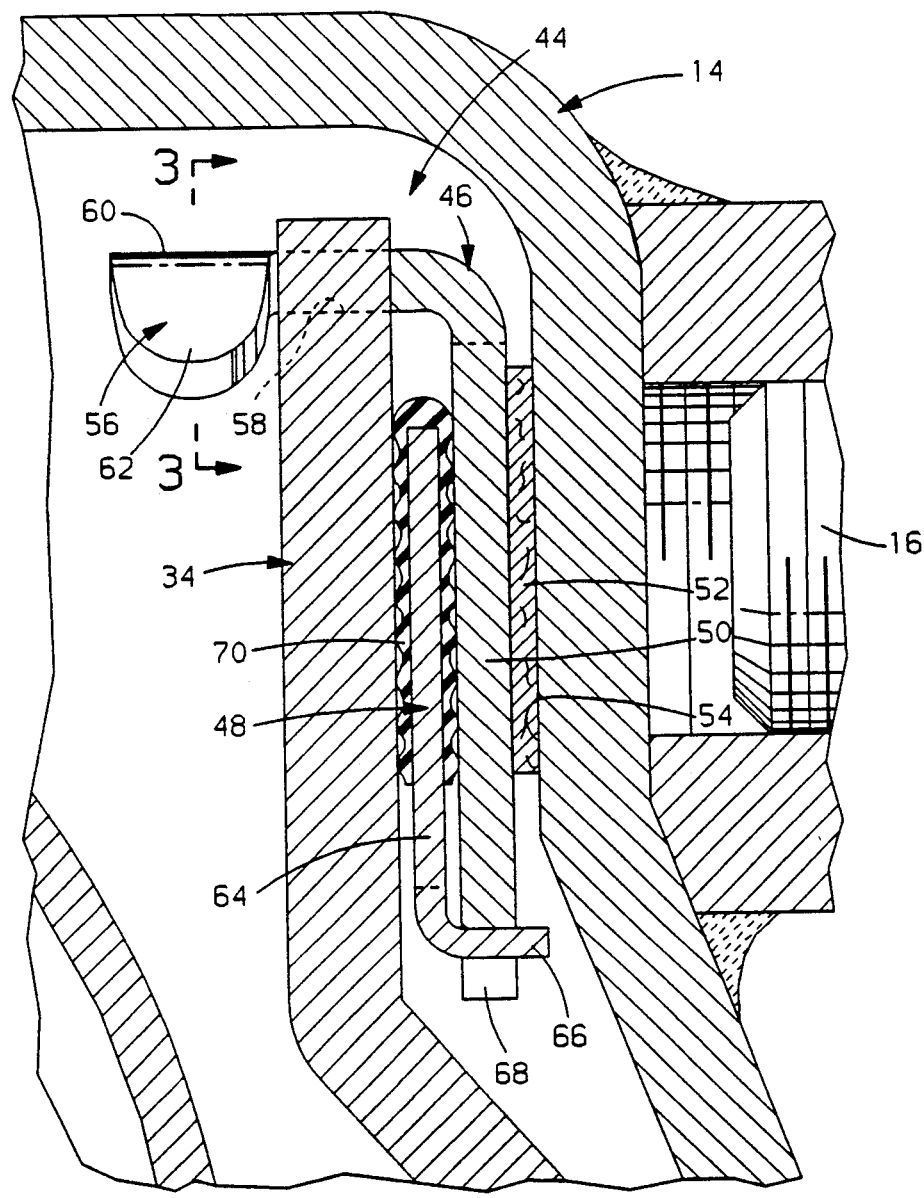
FIG. 2 is a cross-sectional elevational view of a portion of the cross section shown in FIG. 1.
Figure 3:
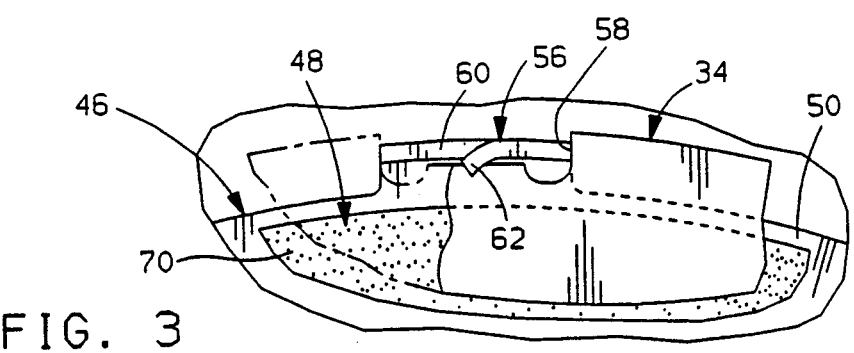
FIG. 3 is a view taken along lines 3—3 of FIG. 2.

The clutch and damper assembly 32 further includes a plurality of spring members 42 which dampen the torsional vibrations introduced at the crankshaft 10 during normal engine operation. The pressure plate 34 is a component of a clutch assembly, generally designated 44 and best seen in FIG. 2.

The clutch assembly 44 includes a clutch disc 46 and a compliance interface or disc 48. The clutch disc 46 has a substantially annular body 50 to which is bonded a conventional annular friction disc 52, which in turn is adapted to contact a friction interface 54 formed on the input shell 14. The clutch disc 46 has a plurality of drive tabs 56 which extend through respective slots 58 formed in the pressure plate 34. The tabs 56 have a circumferential length substantially equal to the circumferential length of the slots 58. The tab 56 has a portion 60 disposed on the torque converter side of the pressure plate 34 which has an axial extent greater than the permitted axial movement of the pressure plate 34 between fully engaged and disengaged positions of the clutch assembly 44.

Thus, the clutch disc 46 cannot be disengaged from the pressure plate 34 after the clutch and damper assembly 32 is installed between the input shell 14 and the turbine 22 and the weldment of the input shell 14 and impeller 20 is completed. To further ensure that the clutch disc 46 will not axially separate from the pressure plate 34, one end 62 of the tab 56 can be displaced radially inward to provide a locking mechanism in the axial direction. This mechanism will allow slight axial displacement between the clutch disc 46 and the pressure plate 34.

The compliance disc 48 has an annular disc portion 64, preferably made of steel, with axially extending tabs 66 formed at the radial inner end thereof. These tabs 66 are equally spaced about the inner periphery of the compliance disc 48 in a position to axially engage respective slots 68 formed in the inner periphery of the clutch disc 46.

In the preferred embodiment, there are four tab 66 and slot 68 connections, and eight tab 56 and slot 58 connections. These connections are axially spaced as previously mentioned about the respective peripheries of the members. The tab 66 and slot 68 are dimensioned and manufactured to limit angular displacement between the compliance disc 48 and the clutch disc 46 and the pressure plate 34 to a minimal amount.

The compliance disc 48 has an elastomeric material portion 70 which is bonded to both sides of the annular disc 64 substantially in axial alignment with the friction disc 52. The elastomeric material 70 permits compliant axial displacement between the pressure plate 34 and the clutch disc 46. The limited angular displacement between these members is not sufficient for the transmission of any significant shear forces between the clutch disc 46 and the compliance disc 48, or between the pressure plate 34 and the compliance disc 48. Thus, the transmission o torque through the frictional interface is completely through the clutch disc 46 and the pressure plate 34, which in turn transmits the torque via the spline 40 to the transmission input shaft 28.

By relieving the elastomeric material 70 of the torsional or shear stresses, the clutch life is improved and the cost of bonding and bonding materials is reduced. This cost will, of course, be partially offset by the need for additional components, however, the improved performance of the clutch due to improved compliance between the friction surfaces will result in improved efficiencies in power transmission to also reduce the overall cost of the system.

As should be evident from the above description, the annular body 50 can be made sufficiently supple to accommodate manufacturing imperfections which might be present at the friction interface 54 of the input shell 14. Due to the weld connection of the input shell 14 to the impeller 20, and the welding of a plurality of lugs 72 to the input shell 14, a number of opportunities for alteration of the configuration of the surface of the friction interface 54 will occur during assembly.

The elastomeric material 70 will permit the annular body 50 to deflect as required to establish substantially a complete annular engagement between the friction disc 52 and the friction interface 54. The elastomeric material 70 in combination with the annular body 50 will quite easily accommodate waviness in the input shell 14, as well as any conical discrepancies of the surface that might occur.

The embodiments of the invention in which an exclusive property or privilege is claimed are defined as follows:

1. A torque converter and clutch comprising: an input shell adapted to be driven by an engine; an impeller drivingly connected with said input shell; a turbine disposed in toroidal fluid flow arrangements with the impeller; an output shaft drivingly connected with said turbine; a selectively engageable friction clutch disposed between said input shell and said turbine and being selectively engageable to connect said input shell to said output shaft; said friction clutch comprising, pressure plate mans drivingly connected with said output shaft, friction plate means drivingly connected to said pressure plate means and being disposed to selectively frictionally engage said input shell, and compliance plate means disposed between said friction plate means and said pressure plate means for permitting relative axial movement therebetween and for permitting compliance between said friction plate means and a friction surface on said input shell, said compliance plate means including resilient means for permitting said compliance between said friction plate means and the friction surface an drive means continuously connecting with one of said friction plate means and said pressure plate means.

2. A torque converter and clutch comprising: an input shell adapted to be driven by an engine; an impeller drivingly connected with said input shell; a turbine disposed in toroidal fluid flow arrangement with the impeller; an output shaft drivingly connected with said turbine; a selectively engageable friction clutch disposed between said input shell and said turbine and being selectively engageable to connect said input shell to said output shaft; said friction clutch comprising, pressure plate means drivingly connected with said output shaft, friction plate means drivingly connected to said pressure plate means including a plurality of axially extending drive tab members engaging respective slots formed on said pressure plate means and being disposed to selectively frictionally engage said input shell, and compliance plate means mounted for axial movement between said friction plate means and said pressure plate means for permitting relative axial movement therebetween and for permitting compliance between said friction plate means and a friction surface on said input shell, said compliance plate means including resilient means for permitting said compliance between said friction plate means and the friction surface and drive connecting means for continuously drive connecting said compliance plate means with said friction plate means.

3. A torque converter and clutch comprising: an input shell adapted to be driven by an engine; an impeller drivingly connected with said input shell; a turbine disposed in toroidal fluid flow arrangement with the impeller; an output shaft drivingly connected with said turbine; a selectively engageable friction clutch disposed between said input shell and said turbine and being selectively engageable to connect said input shell to said output shaft; said friction clutch comprising, pressure plate means drivingly connected with said output shaft, friction plate mans drivingly connected to said pressure plate means including a plurality of axially extending drive tab members engaging respective slots formed on said pressure plate means and being disposed to selectively frictionally engage said input shell, and compliance plate means mounted for axial movement between said friction plate means and said pressure plate means for permitting relative axial movement therebetween and for permitting compliance between said friction plate means and a friction surface on said input shell, said compliance plate means including a solid core member drivingly connected with one of said pressure plate means and friction plate means for continuous rotation therewith and a resilient elastomer member disposed on opposite axially facing surfaces of the core member selectively abutting said pressure plate means and said friction plate means and being deformable for permitting said compliance between said friction plate means and the friction surface.

* * * * *